US006442256B1

(12) United States Patent
Garland et al.

(10) Patent No.: US 6,442,256 B1
(45) Date of Patent: Aug. 27, 2002

(54) SYSTEM AND METHOD FOR ESTABLISHING A CALL PATH THROUGH A PRIVATE NETWORK

(75) Inventors: Stuart M. Garland, DuPage County; Lila N. Russ, Will County; David B. Smith, DuPage County, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/241,346

(22) Filed: Feb. 2, 1999

(51) Int. Cl.[7] .......................... H04M 1/00; H04M 3/42; H04M 7/00; H04M 11/00

(52) U.S. Cl. .............. 379/106.09; 379/231; 379/376.02

(58) Field of Search ............................ 379/106.09, 219, 379/220, 231, 901, 106.01, 106.03, 106.05, 106.11, 220.01, 252, 372, 376.02, 377, 418

(56) References Cited

U.S. PATENT DOCUMENTS

| | | | | | |
|---|---|---|---|---|---|
| 4,533,792 | A | * | 8/1985 | Binks et al. | 379/372 |
| 5,384,622 | A | * | 1/1995 | Hirata et al. | 379/106.01 X |
| 5,602,911 | A | * | 2/1997 | Ost, Sr. | 379/376 |
| 5,737,400 | A | * | 4/1998 | Bagchi et al. | 379/198 X |
| 5,802,155 | A | * | 9/1998 | Garland et al. | 379/106.09 |
| 5,897,607 | A | * | 4/1999 | Jenney et al. | 702/62 |

* cited by examiner

*Primary Examiner*—Harry S. Hong
(74) *Attorney, Agent, or Firm*—Grossman Patti & Brill

(57) ABSTRACT

A system and method for utilizing suppressed ringing with a plurality of communication devices. The system creates a suppressed ringing signal, at a remote computer, for at least one of the plurality of communication devices, implements a protocol to direct the suppressed ringing signal to the communication device through a private network and transmits the suppressed ringing signal from the remote computer, through the private network, to the communication device.

20 Claims, 5 Drawing Sheets

SYSTEM
33
REMOTE COMPUTER
10
REPLY SIGNAL 80
20
CENTRAL OFFICE SWITCH
15
REPLY TRANSMITTER
60
ROUTER
65
NOTIFICATION TRANSMITTER
70
PRIVATE NETWORK REPLY SIGNAL 100
105
75
35
PRIVATE NETWORK
40
ROUTER
90
REPLY TRANSMITTER
85
TRANSMITTER
95
COMMUNICATION DEVICE 1
45
COMMUNICATION DEVICE 2
50
COMMUNICATION DEVICE 3
55

SYSTEM AND METHOD FOR ESTABLISHING A CALL PATH THROUGH A PRIVATE NETWORK

BACKGROUND OF THE INVENTION

This invention generally relates to telecommunication systems and methods, and more particularly, to systems and methods that perform suppressed ringing through a private branch exchange type system.

Certain telecommunication networks include local multi-port switches that service a plurality of individual telecommunication lines, or customer lines, to which are connected conventional telephones, facsimile communication systems, security systems, cable television converters and the like. More recently, utility service providers, such as local electric power, natural gas and water providers, are capable of accessing their usage meters located at customer locations through the telecommunication lines for the customers via a suppressed ringing protocol, such as described in U.S. Pat. No. 5,189,694 issued Feb. 23, 1993 to Garland for "Telemetry Access Arrangement" and U.S. Pat. No. 5,509,054 issued Apr. 16, 1996 to Garland for "Communication Switching System." Both of these patents are hereby incorporated by reference with respect to such suppressed ringing and should also be referred to for general background on telephonic networks.

Suppressed ringing sets up a call path between a server and a device such as a telemetry interface unit (TIU) or a consumer premise equipment (CPE). The server first sends a tone that alerts (wakes up) the TIU without ringing the line connected to the TIU. Alternatively, a frequency shift keying (FSK) signal alert technique may be employed. Once the TIU is active, the server then communicates with the TIU. This allows for two way communication between the server and the TIU without bothering (ringing) the consumers at the location of the TIU or the features that the consumers may have enabled such as call forwarding, call blocking, automatic recall or other similar features.

Unfortunately, suppressed ringing at present only services directly connected end point devices such as TIUs. Devices which are coupled with an intermediate a private branch exchange (PBX) type communication system can not be reached because the PBX manages the call path. The PBX manages the call path because it is a concentration and routing device.

The problem with a PBX is that the concentration of trunking in and out does not allow direct sending of information to a specific PBX member such as a message waiting indication to light a light on the CPE. When a call is sent to a PBX member, the switch sends the information to the PBX and the PBX connects the call path if a line is available.

SUMMARY OF THE INVENTION

The above problems are solved, and a number of technical advances are achieved in the art, by implementing a system and method that notifies the private network, such as a PBX, of a received path signal from a central office switch, establishes a call path through the private network and notifies the central office switch that the call path exists.

In accordance with the invention, a system for utilizing suppressed ringing with a plurality of communication devices is described. The system comprises a private network and a path signal generator that generates a path signal, at a remote computer, for at least one of the plurality of communication devices. A protocol is utilized to direct the path signal to the at least one communication device through the private network. A transmitter is employed to transmit the path signal through the private network to the at least one communication device.

Also in accordance with the invention, a method for utilizing suppressed ringing with a plurality of communication devices is described. The method comprises the steps of creating a path signal, at a remote computer, for at least one of the plurality of communication devices, implementing a protocol to direct the path signal to the at least one communication device through a private network and transmitting the path signal from the remote computer, through the private network, to the at least one communication device.

BRIEF DESCRIPTION OF THE DRAWINGS

The foregoing advantageous features of the invention will be described in detail and other advantageous features will be made apparent upon reading the following detailed description that is given with reference to the several figures of the drawings, in which.

DETAILED DESCRIPTION

Figure 1:
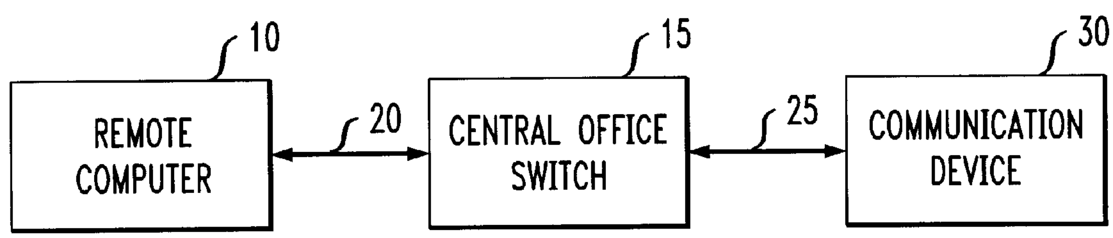
FIG. 1 shows an example of a conventional suppressed ringing system.

FIG. 1 shows an example of a conventional suppressed ringing system. In FIG. 1, a remote computer 10 is connected to central office switch 15, via connection 20, and central office switch 15 is also connected, via connection 25, to communication device 30 such as a customer premises equipment (CPE) or telemetry interface unit (TIU).

The remote computer 10 is any computer system that transmits information to, or receives information from, the communication device 30. As an example, the remote computer 10 is a messaging computer and the communication device 30 is a telephone system that has voice messaging features. The remote computer 10 uses the suppressed ringing call path to communicate messaging features (without ringing) to and from the communication device 30.

Alternatively, the remote computer 10 is implemented as alarm monitoring system and the communication device 30 is a remote alarm sensor located at a protected premises. Remote alarm monitoring and control systems are known that utilize telecommunications to distribute warning messages. A call is placed from the alarm monitor system to the remote alarm sensor. After the connection is made, the alarm monitor system provides telemetric or other alarm information to the remote alarm sensor. Such systems use suppressed ringing to make the connection as shown in U.S. Pat. No. 5,189,694 and U.S. Pat. No. 5,509,054 both to Garland. Additionally, reference should also be made to U.S. Pat. No. 5,394,461 issued Feb. 28,1995, to Garland for "Telemetry Feature Protocol Expansion" which also shows a termination alarm system and is hereby incorporated by reference.

Figure 2:
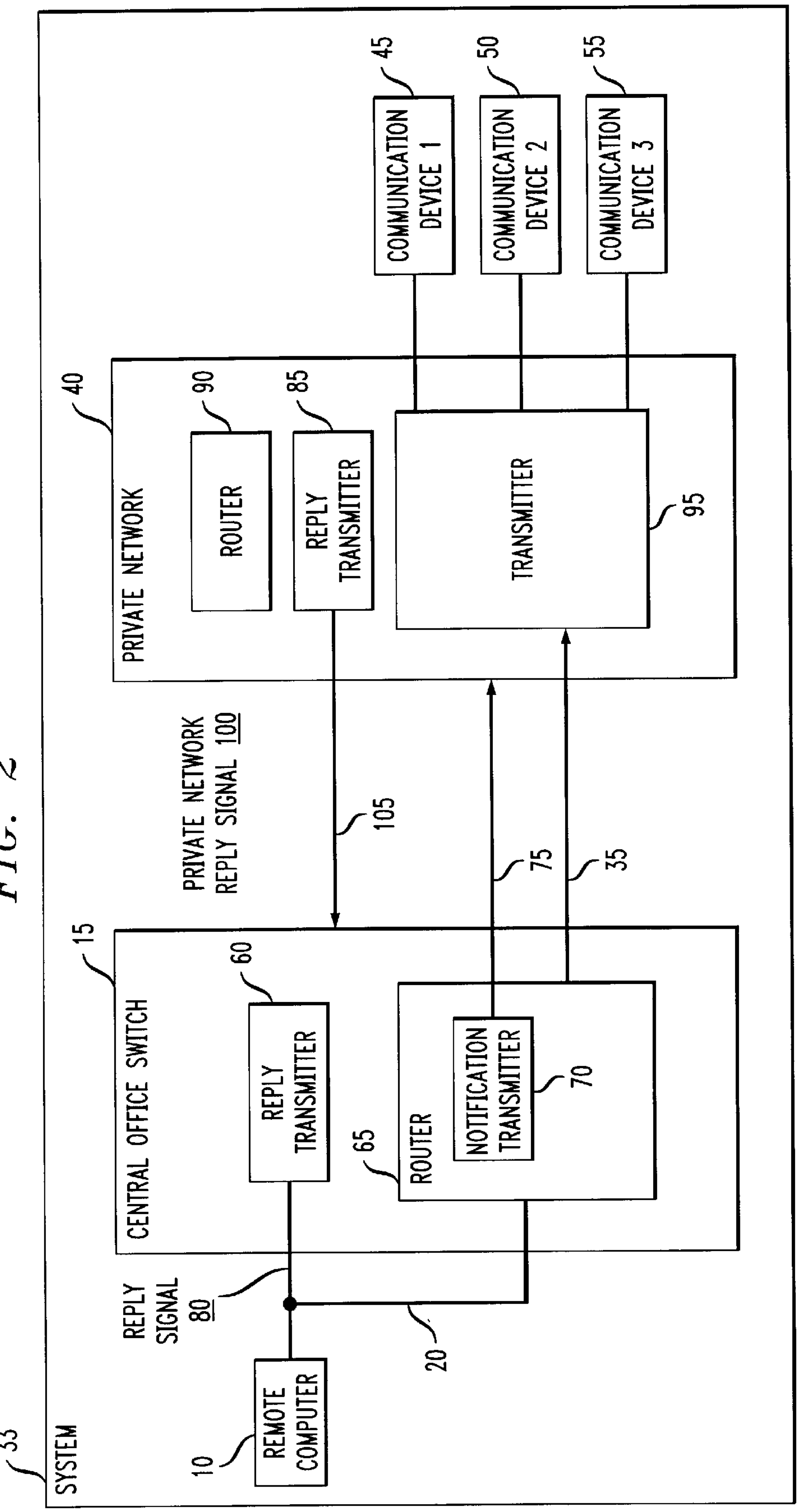
FIG. 2 shows a functional block diagram for the system of the invention with one central office switch.

FIG. 2 shows a block diagram for the call path system 33 of the invention. In FIG. 2, a remote computer 10 is coupled to central office switch 15, via connection 20, and the central office switch 15 is also coupled, via connection 35, to a private network 40. The private network 40 is connected to number of communication devices 45, 50 and 55. Three communication devices are shown for illustration purposes only as it will be appreciated that the present invention is enabled to be performed with more or fewer communication devices.

The remote computer 10 is preferably any computer system that transmits information to, or receives information from, the communication devices 45, 50 and 55. The central office switch 15 is a switch located at facility in which communication lines, preferably associated with a particular subscriber, are joined to telecommunication network switching equipment for connecting other subscribers to each other. An example of a central office switch 15 which may be suitably employed is a 5ESS®-2000Switch manufactured by Lucent Technologies, Inc.

Within the central office switch 15 is a central office reply transmitter 60 and central office router 65. The central office router 65 preferably employs a central office notification transmitter 70. The notification transmitter 70 sends a notification signal 75 via connection 35 to the private network 40 and the reply transmitter 60 sends a reply signal 80 to the remote computer 10 via connection 20.

The private network 40 is preferably a controlled access point which is connected between the plurality of communication devices 45, 50 and 55 and the central office switch 15. Examples of the communication devices 45, 50 and 55 are customer premises equipment (CPE), telemetry interface unit (TIU), computer modem, and any programmable communication device. Examples of the private network 40 are a private branch exchange (PBX), virtual PBX, multi-button key set switch, ISDN mutli-point switch, wireless switch, local area network (LAN) and a residential gateway. Within the private network 40 is a private network reply transmitter 85, a private network router 90 and a private network transmitter 95. The reply transmitter sends a private network reply signal 100 to the central office switch 15 via connection 105.

Figure 3:
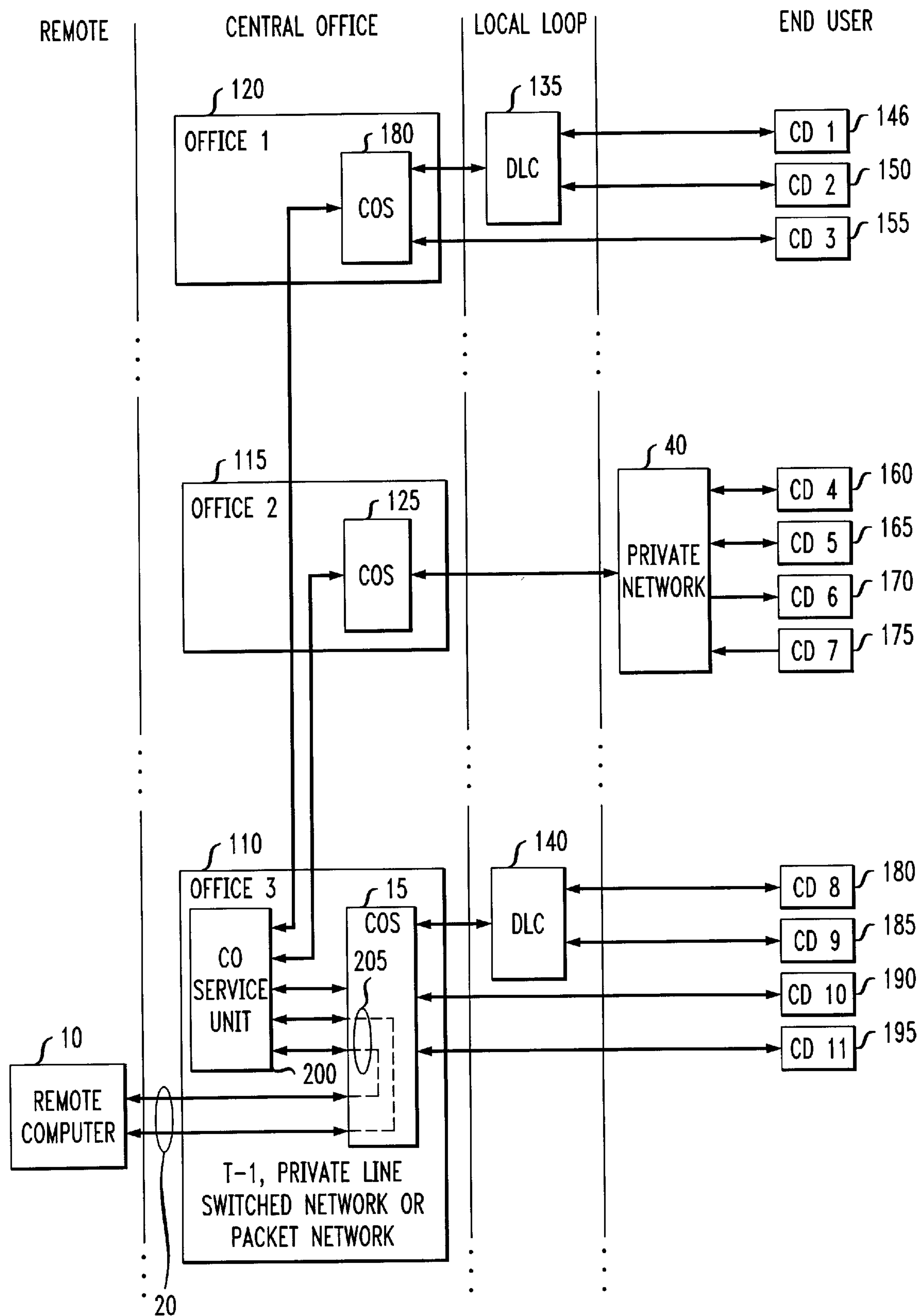
FIG. 3 shows a functional block diagram for the system of the invention in a network environment with multiple central office switches.

FIG. 3 illustrates the call path system 33 with a plurality of central offices 110, 115 and 120. Each central office 110, 115 and 120 consists of a central office switch 15, 125 and 130. Each central office switch 15, 125 and 130 is coupled to at least one of the following: a digital loop carrier (DLC) 135 and 140, a private network 40, or a combination of communication devices 145, 150, 155, 160, 165, 170, 175, 180, 185, 190 and 195. Central office switch 15 is connected to communication devices 190 and 195 directly and communication devices 180 and 185 via DLC 140. Central office switch 125 is connected to communication devices 160, 165, 170 and 175 via the private network 40. Central office switch 130 is connected directly to communication device 155 and indirectly, via DLC 135, to communication devices 145 and 150.

The remote computer 10 is connected, via connection 20, to the central office 110. Within the central office 110 is the central office switch 15 and a central office service unit 200. The central office service unit 200 connects the remote computer 10 to the central office switches 15, 125 and 130. The remote computer 10 is coupled to the central office service unit 200 via connection 20 and pass through connection 205 in the central office switch 15. The pass through connection 205 is a dial up connection between the remote computer 10 and the central office service unit 200. It may be a dial up, T1, or private line.

It will be appreciated that DLCs 135 and 140 are types of network transmission equipment used to provide a pair gain function. DLC 135 and 140 consist of two parts, a central office terminal and a remote terminal. As an example, the central office terminal is the central office 120 for DLC 135 and the central office 110 for DLC 140. The central office terminal provides the multiplexing/demultiplexing function of individual voice signals to the composite multiplexed signal at the interface between the switching equipment (central office switches 15 and 130) and the DLC 140 and 135. The remote terminal provides the multiplexing/demultiplexing function at the interface between the individual subscriber pairs (communication devices 145, 150, 180 and 185) and the DLC 135 and 140. Alternatively, another DLC is of an integrated version type whereby the central office terminal is integrated into the central office switch.

Figure 4:
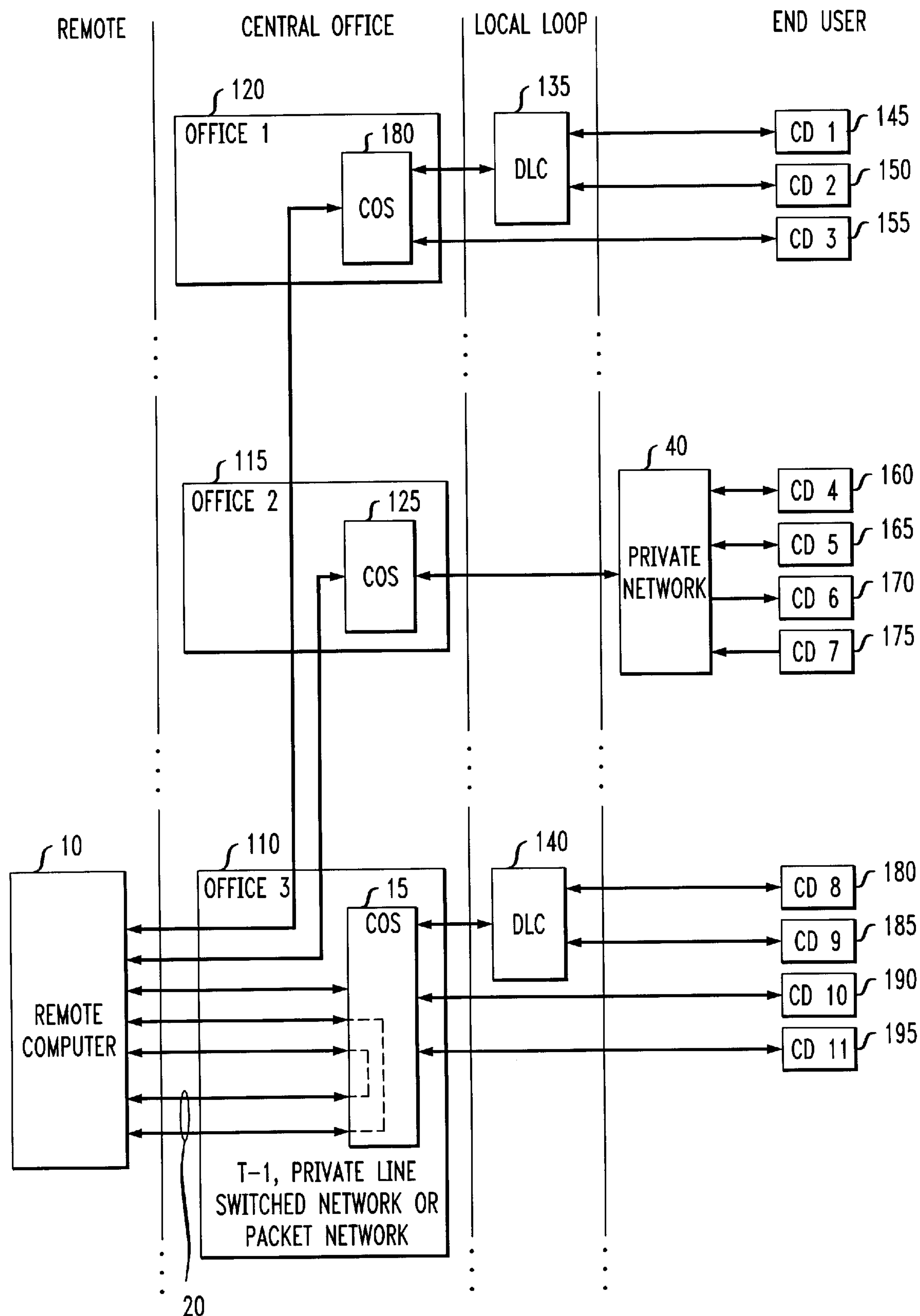
FIG. 4 shows an alternative functional block diagram for the system of the invention in a network environment with multiple central office switches.

FIG. 4 is an alternative illustration of the call path system 33. The functional blocks are the same as in FIG. 3 except for the central office service unit 200. In FIG. 4 the central office switches 15, 125 and 130 bypass the central office service unit 200 and connect directly to the remote computer 10 via the central office 110 so that the remote computer 10 drives the central office switches 15, 125 and 130 directly.

Figure 5:
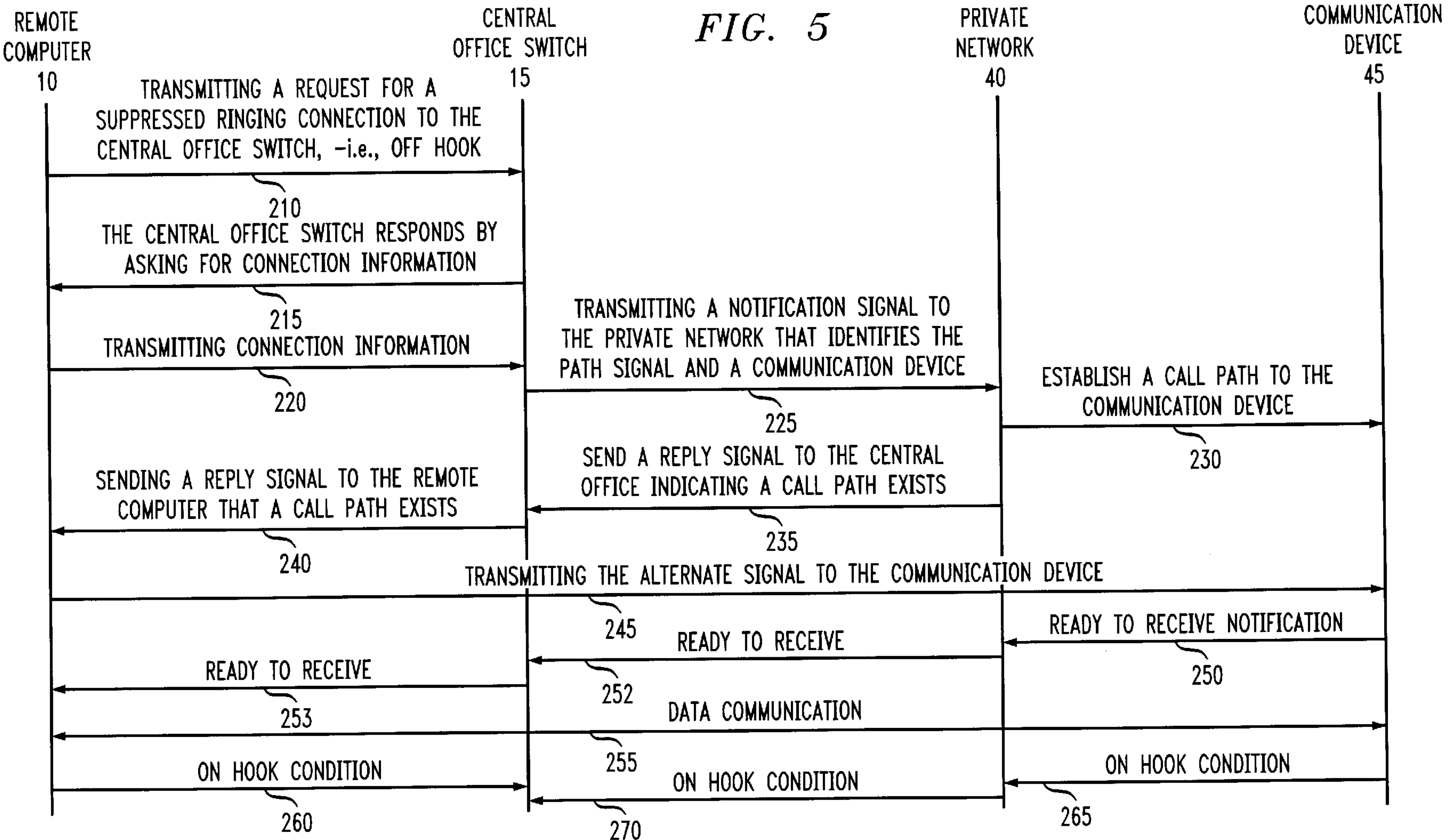
FIG. 5 is a signal flow diagram showing the process performed by the system of FIG. 2.

FIG. 5 is a signal flow diagram for the process performed by the system of FIG. 2. The process begins at the remote computer 10. In step 210, the remote computer 10 transmits a request for a suppressed ringing connection to one of the communication devices 45, 50 and 55 via connection 20, FIG. 2, to the central office switch 15. In step 215, FIG. 5, the central office switch 15 receives the request and responds by sending a request, to the remote computer 10, for the connection information of corresponding communication device 45, 50 and 55. In step 220, the remote computer 10 transmits the requested communication information for the specific communication device 45, 50 and 55. The central office switch 15, in step 225, transmits a notification signal 75, FIG. 2, via connection 75, with the notification transmitter 70 to the private network 40 that identifies the path signal and the desired communication device 45, 50 and 55. This is also known as a switch cut through connection to private network 40. For illustration purposes only communication device 45 is employed for the call path description herein. Additionally, a protocol for the private network control preferably includes application and routing control information such as PRI user to user or network specific facility messages.

For the cut through connection, if the connection is on dedicated suppressed ringing trunks to the private network 40 (i.e. there are suppressed ringing trunks between the remote computer 10 and the central office switch 15), all the calls through the private network 40 are treated as suppressed ringing calls. If instead, the connection is not on dedicated suppressed ringing trucks, inband signals may alternatively be employed.

The private network 40 receives the notification signal and, in step 230, establishes a call path from the central office switch 15 to communication device 45. The private network 40 then transmits, in step 235, a private network reply signal 100, FIG. 2, via connection 105, with the reply transmitter 85 to the central office switch 15. Once received, the central office switch 15, in step 240, sends a reply signal 80, via connection 20, to the remote computer 10 that a call path from the central office switch 15, through the private network 40, to the communication device 45 exits. The remote computer 10 then transmits a wake up (alert) signal, also part of the path signal, to the communication device 45 in step 245.

In step 250, the communication device 45 receives the alert signal and responds to the private network with a ready to receive notification. The private network 40, in step 252, then sends a ready to receive signal to the central office switch 15 and the central office switch 15, in step 253, sends a ready to receive signal to the remote computer 10. In step 255, the remote computer 10 and the communication device 45 communicate either mono-directionally, bi-directionally, full duplex or half duplex.

Once communication between the remote computer 10 and the communication device 45 is complete the remote computer 10, in step 260, stops transmitting and receiving by sending an on hook condition signal to the central office switch 15. Additionally, the communication device 45 may stop transmission or reception by going to an on hook condition in step 265 which places the private network 40 into an on hook condition in step 270.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed:

1. A method for utilizing suppressed ringing signalling with a plurality of communication devices, the method comprising the steps of:

creating a signal, at a remote computer, for at least one of the plurality of communication devices;

executing a protocol to direct the signal through a call path utilizing suppressed ringing signalling through a private network to the at least one communication device; and transmitting the signal from the remote computer through the private network via the call path to the at least one communication device.

2. The method of claim 1, wherein the step of executing the protocol further includes the steps of:

transmitting the signal to a central office switch;

establishing a call path utilizing suppressed ringing from the remote computer, through the central office switch, through the private network, to the at least one communication device; and sending a reply signal from the central office switch to the remote computer indicating that the call path exists.

3. The method of claim 2, wherein the step of establishing the call path further includes the steps of:

transmitting a notification signal to the private network, from the central office switch, that identifies the signal and the at least one communication device;

establishing a call path utilizing suppressed ringing from the private network to the at least one communication device; and sending a private network reply signal from the private network to the central office indicating that the call path exists.

4. The method of claim 1, wherein the private network is at least one of: (a) a private branch exchange, (b) a virtual private exchange, (c) a multi-button key set switch, (d) an ISDN multi-point switch, (e) a wireless switch, (f) a local area network, and (g) a residential gateway.

5. The method of claim 1, further including the steps of creating a message signal and transmitting the message signal to a service platform.

6. The method of claim 5, wherein the service platform is at least one of: (a) a unified messaging platform, (b) a paging system, and (c) a public safety answering position.

7. The method of claim 1, wherein the communication device is at least one of: (a) a telephonic communication device, (b) a programmable non-telephonic device, and (c) a computer.

8. A system for utilizing suppressed ringing signalling with a plurality of communication devices, the system comprising:

a private network;

means for creating a signal, at a remote computer, for at least one of the plurality of communication devices;

a protocol to direct the signal through a call path utilizing suppressed ringing signalling to the at least one communication device through the private network; and a transmitter for transmitting the signal through the private network via the call path to the at least one communication device.

9. The system of claim 8, wherein the protocol further includes:

means for transmitting the signal to a central office switch;

means for establishing a call path utilizing suppressed ringing from the remote computer, through the central office switch, through the private network, to the at least one communication device; and means for sending a reply signal from the central office switch to the remote computer indicating that the call path exists.

10. The system of claim 9, wherein the establishing means further includes:

a transmitter for transmitting a notification signal to the private network, from the central office switch, that identifies the signal and the at least one communication device;

means for establishing a call path utilizing suppressed ringing from the private network to the at least one communication device; and means for sending a private network reply signal from the private network to the central office indicating that the call path exists.

11. The system of claim 8, wherein the private network is at least one of: (a) a private branch exchange, (b) a virtual private exchange, (c) a multi-button key set switch, (d) an ISDN multi-point switch, (e) a wireless switch, (f) a local area network, and (g) a residential gateway.

12. A system for utilizing suppressed ringing signalling with a plurality of communication devices, the system comprising:

a private network;

a signal generator to generate a signal, at a remote computer, for at least one of the plurality of communication devices;

a protocol to direct the signal through a call path utilizing suppressed ringing signalling to at least one communication device through the private network; and a transmitter to transmit the signal through the private network via the call path to the at least one communication device.

13. The system of claim 12 further including:

a remote computer transmitter to transmit the signal to a central office switch;

a router for establishing a call path utilizing suppressed ringing from the remote computer, through the central office switch, through the private network, to the at least one communication device; and a central office reply transmitter for sending a reply signal from the central office switch to the remote computer indicating that the call path exists.

14. The system of claim 13, wherein the router further includes:

a central office notification transmitter for transmitting a notification signal to the private network, from the central office switch, that identifies the signal and the at least one communication device;

a private network router for establishing a call path utilizing suppressed ringing from the private network to the at least one communication device; and a private network reply transmitter for sending a private network reply signal from the private network to the central office indicating that the call path exists.

15. The system of claim 14, wherein the private network is at least one of: (a) a private branch exchange, (b) a virtual private exchange, (c) a multi-button key set switch, (d) an ISDN multi-point switch, (e) a wireless switch, (f) a local area network, and (g) a residential gateway.

16. The system of claim 12, wherein the protocol requests the private network to suppress ringing for the communication path to the at least one termination device.

17. The method of claim 1, wherein the step of executing comprises requesting the private network to suppress ringing for the communication path to the at least one termination device.

18. A method comprising the steps of:

establishing a communication path utilizing suppressed ringing call set-up signalling from an origination device through a private network to at least one termination device;

transmitting a signal from the origination device to the at least one termination device via the communication path, such that ringing is suppressed at the at least one termination device.

19. The method of claim 18, wherein the step of establishing comprises requesting the private network to suppress ringing for the communication path to the at least one termination device.

20. A method comprising the steps of:

establishing a communication path utilizing suppressed ringing call set-up from an origination device through a private network to at least one termination device, wherein at least one device in the communication path is part of the public switched telephone network;

transmitting a signal from the origination device to the at least one termination device via the communication path, such that ringing is suppressed at the at least one termination device.

* * * * *